July 2, 1968  J. C. MEDLEY ET AL  3,390,735
STEERING SYSTEM FOR VEHICLES WITH TWO STEERABLE TRACTOR UNITS
Filed Oct. 23, 1965  5 Sheets-Sheet 2
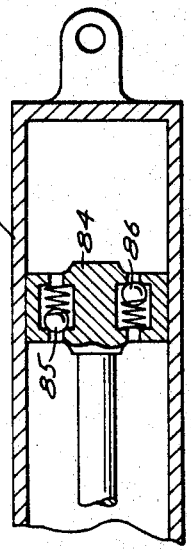
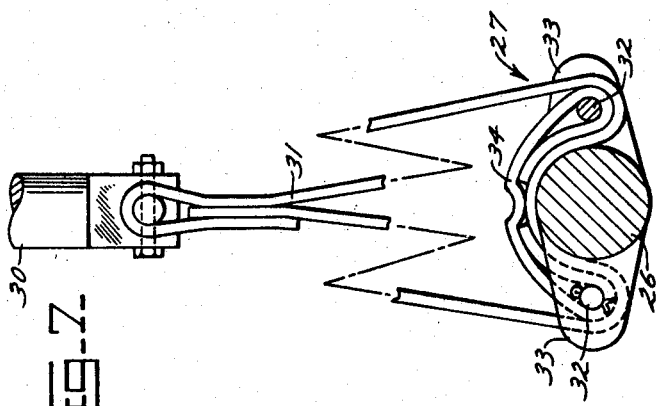
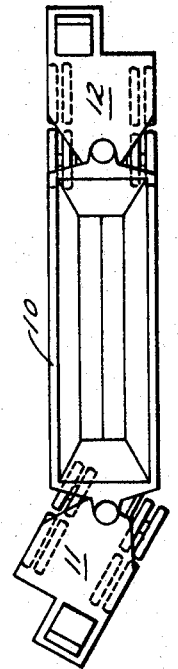
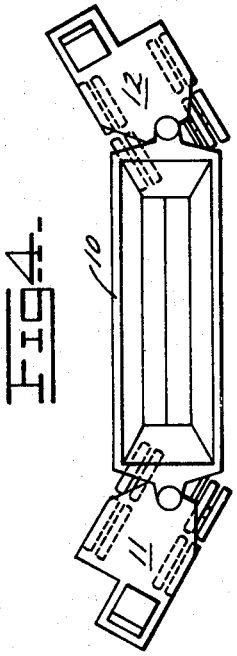
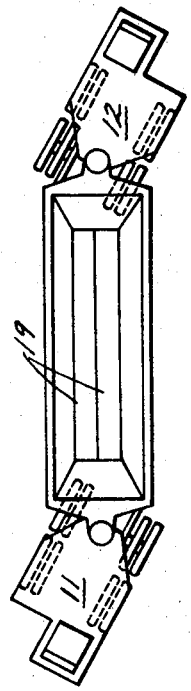
INVENTORS
JACKSON C. MEDLEY
DONALD L. SMITH
JAMES P. MUELLER
BY JAMES M. KOSTAS
ATTORNEYS

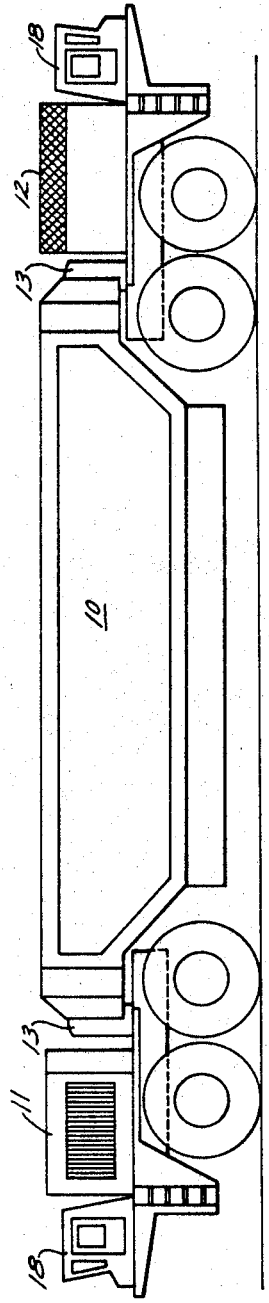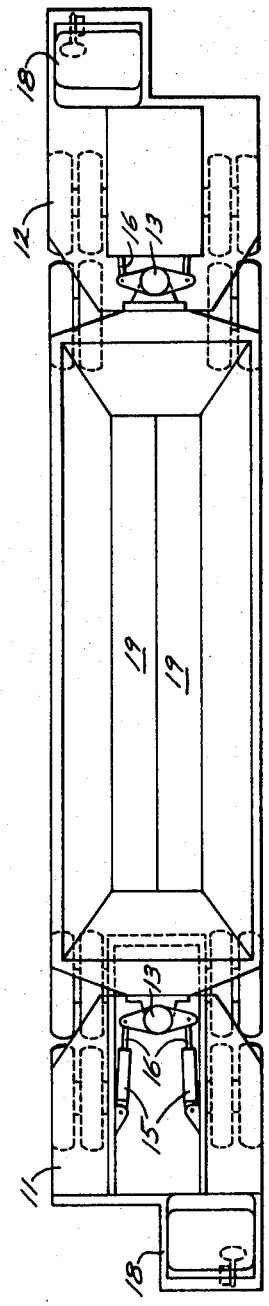

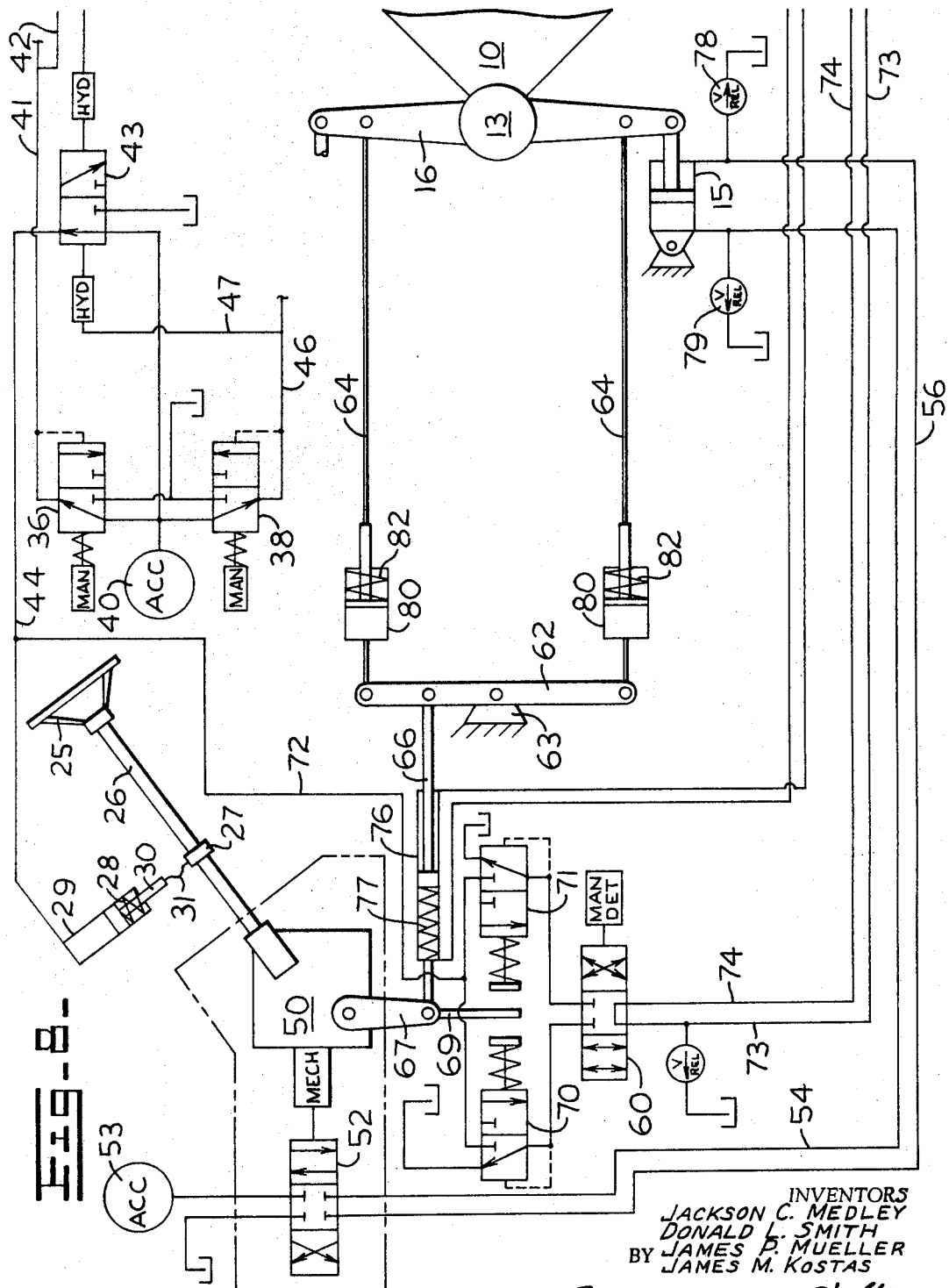

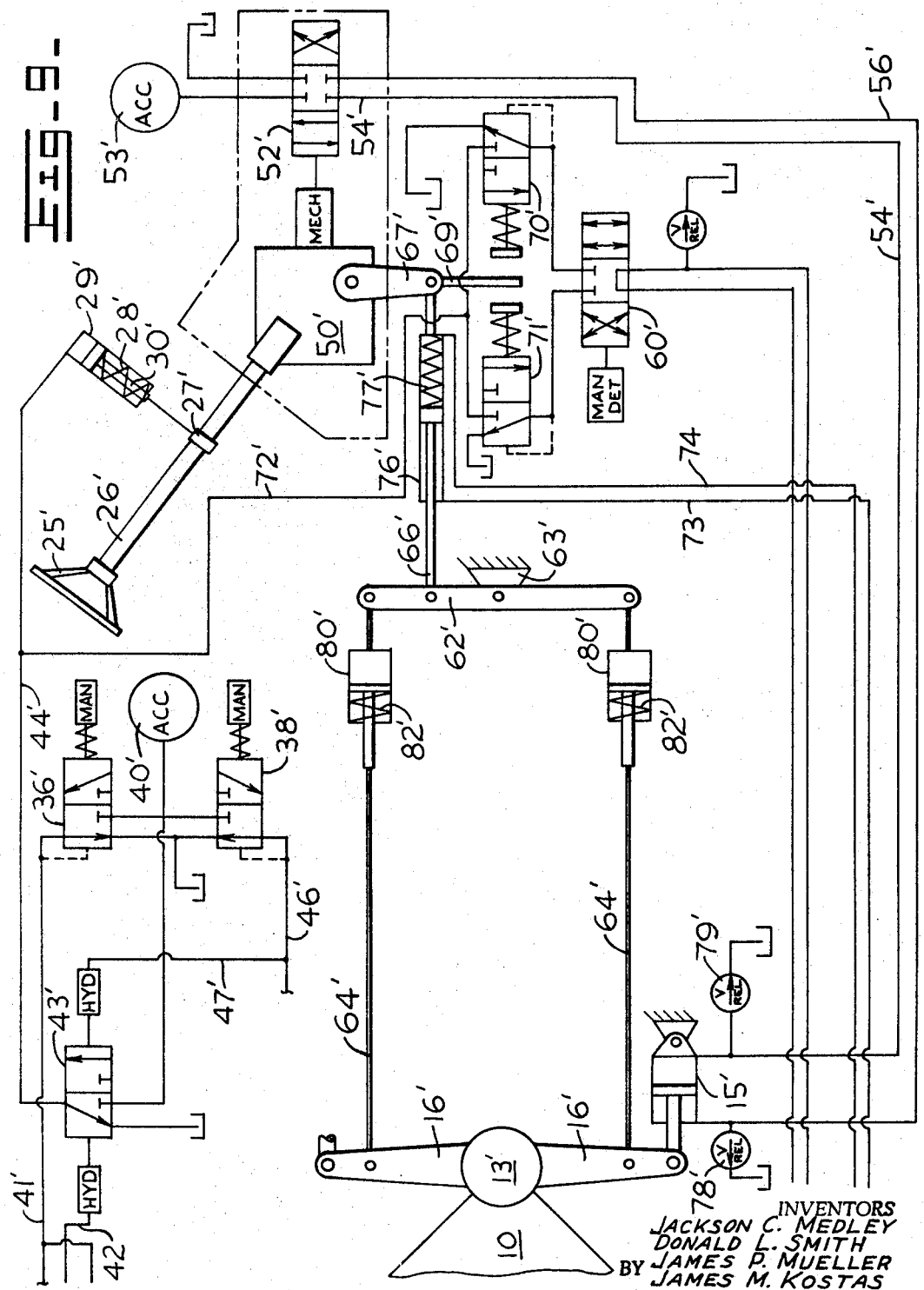

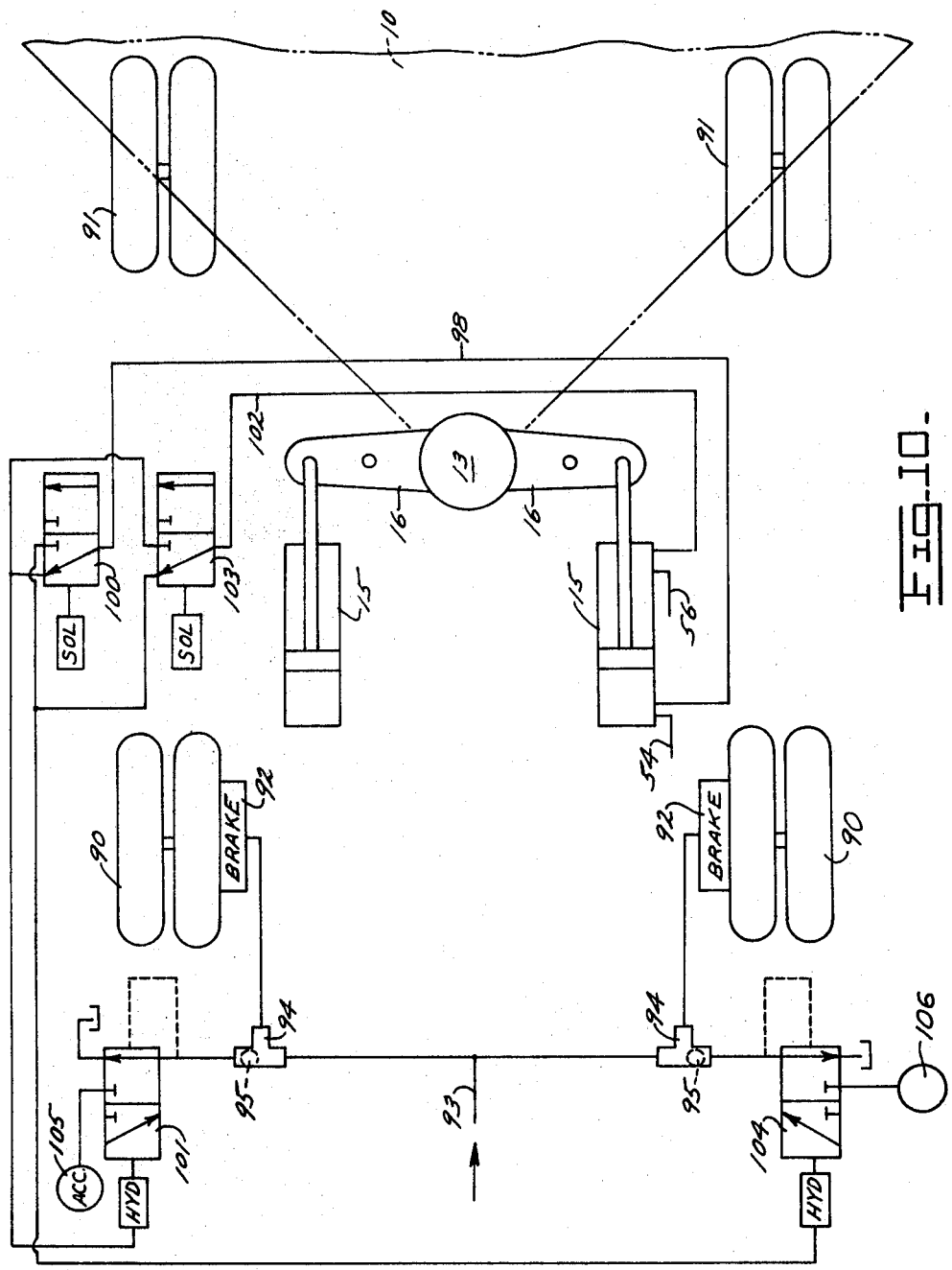

United States Patent Office 3,390,735
Patented July 2, 1968

3,390,735
STEERING SYSTEMS FOR VEHICLES WITH TWO STEERABLE TRACTOR UNITS
Jackson C. Medley, East Peoria, Donald L. Smith, Peoria, James P. Mueller, East Peoria, and James M. Kostas, Peoria, Ill., assignors to Caterpillar Tractor Co., Peoria, Ill., a corporation of California
Filed Oct. 23, 1965, Ser. No. 503,975
7 Claims. (Cl. 180—79.2)

ABSTRACT OF THE DISCLOSURE

A vehicle body with a drive tractor on each end thereof wherein operation of the accelerator means in either tractor locks the steering means in the opposite tractor against movement and operation of the brake means in either tractor release the steering means of that tractor. Further, steering of both of the tractors is controlled from either of the tractors whereby the vehicle unit may be steered in single tractor, circle, or crab steering at the selection of the operator.

---

This invention relates to the steering of large vehicles of the type having two separate tractor units disposed in supporting relation to opposite ends of a large material hauling body.

A vehicle of the kind to which the present invention is applicable is disclosed in our assignee's pending application of Ralph H. Kress and Jackson C. Medley for Suspension System for Heavy Vehicles, filed Sept. 21, 1965, Ser. No. 488,985, now U.S. Patent No. 3,330,578. Such a vehicle is also briefly disclosed in this application by reference to the first five figures of the drawings in order to clarify distinctions between different types of steering.

Steering of the vehicle disclosed in this application is accomplished by changing the angle of the tractors with respect to the body and to each other as distinguished from steering with dirigible wheels as in most automotive equipment. As will be described, different types of steering are possible through the use of one or both tractors making available three methods of steering which will be referred to as single tractor, circle and crab steering and which will be clearly defined in the following specification.

Another characteristic of this very large vehicle is that the tractor units at its opposite ends appear to face away from each other and have cabs or operator's stations facing away and each with complete controls so that an operator can in effect drive forwardly from either cab and avoid 180° turns which are sometimes undesirable.

It is an object of the invention to provide a steering system for a vehicle of the kind referred to wherein an operator in either of two stations can readily select one of three types or modes of steering and effect all necessary adjustments at the other station.

Another object of the invention is to provide a steering system for a vehicle with tractors at its opposite ends in which steering may be accomplished through the same mechanism to provide single tractor, circle or crab steering.

Further and more specific objects and advantages of the invention and the manner in which it is practiced will be understood from the following specification wherein reference is made to the accompanying drawings:

In the drawings:

FIG. 1 is a schematic view in side elevation showing a vehicle of the type with which the present invention is used;

FIG. 2 is a similar view in plan of the same vehicle with parts removed to disclose a part of the steering mechanism;

FIGS. 3, 4 and 5 are schematic views to illustrate positions assumed by the vehicle components during single tractor, circle and crab steering, respectively;

FIG. 6 is a schematic detail illustrating the use of check valves in a piston in a hydraulic cylinder;

FIG. 7 is a schematic view illustrating a brake used for preventing rotation of a steering column;

FIGS. 8 and 9 are views which, taken together with FIG. 8 disposed to the left of FIG. 9, show a schematic circuit for the steering of two remotely disposed tractor units; and, FIG. 10 is a schematic view illustrating the circuit on one tractor for applying brakes in response to pressure in the steering jacks of the types shown in FIGS. 8 and 9.

Referring to FIGS. 1 and 2, the vehicle disclosed comprises a body 10 supported between two tractor units 11 and 12. The supporting connections or kingpins are shown at 13 and each comprises, as fully disclosed in our assignee's copending application of Kress, Medley and Kostas, entitled, Hitch for Heavy Duty Hauling Vehicles, filed Oct. 23. 1965, Ser. No. 503,038, a piston-like member secured to and extending vertically from the tractor and a cylinder embracing the piston-like member and secured to the body 10. It is the cylinder which is shown at 13 in the present drawings and, as described in the copending application mentioned, a body of oil under pressure is contained between the piston and cylinder for sustaining the major portion of the weight of the body and its load. Furthermore, since the ground clearance beneath the body is normally quite small, it is possible to increase the pressure of oil within the cylinders, thus raising the entire body a considerable distance with respect to the ground. This affects the operation of the steering mechanism of the present invention as will later be described.

Each tractor is supported by four sets of dual wheels as shown in FIG. 2, the front wheel being driven but none of the wheels being steerable or dirigible with respect to the tractor unit. Steering is accomplished by steering jacks which are exposed on the lefthand tractor of FIG. 2 by removal of the engine unit therefrom and shown at 15. Each jack is illustrated as connected between the tractor frame and a pair of brackets 16 secured to and extending outwardly from the kingpin cylinder 13. Since this cylinder is secured to the body, the brackets 16 are, in effect, a part of the body so that extension of one jack 15 and retraction of the other causes angular displacement of the tractor with respect to the body as clearly appears in the examples illustrated in FIGS. 3, 4 and 5. It will be observed that such steering action causes skidding or scrubbing of the tires on the earth considerably more than conventional automotive steering. However, steering of such very large vehicles is usually minimal and tire wear can be disregarded in view of the advantages derived. The tractors 11 and 12 are identical so that each is provided with steering jacks as shown at 15 and with an operator's station or cab 18 from which steering, as well as all other functions of the vehicle, may be controlled, it being understood that all controls are provided in duplicate so that an operator has complete control of the vehicle from the cab 18 of either tractor unit.

Referring now to FIGS. 3, 4 and 5, FIG. 3 illustrates a typical position of the parts assumed during single tractor steering wherein tractor 11 has been steered to an angle with respect to the body 10 and the course will be on an arc with the tractor 12 trailing much in the manner of the rear wheels of any ordinary vehicle.

FIG. 4 illustrates an example of circle steering where tractors 11 and 12 are both angled toward one side of the body 10 to cause steering on a circular path the radius of which will obviously be considerably smaller than that accomplished with the single tractor steering of FIG. 3.

FIG. 5 shows an example of crab steering, so called because of the crab-like or sideways motion imparted to the body, wherein tractors 11 and 12 assume the same angle in opposite directions with respect to the body. With crab steering the tractors advance forwardly on parallel paths carrying the body forwardly and sidewardly at an angle. This steering is useful in obtaining sideways displacement of the unit in a very limited space. It is also useful in spreading a load which is being dumped through bottom dump doors shown at 19 in FIGS. 2 and 5.

Each of the three steering modes represented in FIGS. 3, 4 and 5 can be accomplished by an operator in the cab 18 of either tractor unit and following is a description of the circuits and mechanism which makes this possible.

In the dual tractor vehicle employing the system of the present invention, the tractor occupied by the operator becomes the master tractor for steering while the other tractor becomes the slave. Steering is basically hydraulic and a known type of steering control used in systems having jacks such as shown at 15 in FIG. 2 lends itself to conversion from a master to a slave mechanism as will presently appear.

The steering of articulated vehicles with hydraulic jacks is well-known, one typical mechanism for such steering being disclosed in our assignee's patent to Gustafson 2,614,644. It is characteristic of such systems that a steering wheel is turned to move a mechanical device which opens a steering valve. A follow-up linkage connects the steered mechanism with the same mechanical device and, as steering takes place, moves the device to close the valve, thus the arc of turning corresponds to the position in which the wheel is held. With such steering it is possible by holding the steering wheel against rotation to cause steering by moving the steering valve with the follow-up linkage. The present invention takes advantage of this possibility and enables the use of rather simple means for steering two tractors from one station and also for reversing the master-slave status of the tractors.

FIGS. 8 and 9 of the drawings, when placed together with FIG. 8 on the left side, form a single, schematic diagram illustrating the hydraulic circuits and some of the mechanical parts on two tractors, FIG. 8 illustrating the master and FIG. 9 the slave system. Identical parts of the two systems will be given the same reference characters; those of FIG. 9 being primed. The slave tractor steering wheel is normally locked against rotation by a brake applied to the steering column, such a brake being illustrated in FIG. 7. The steering wheel is shown at 25 in FIG. 8 and 25' in FIG. 9, the columns being shown at 26 and 26' respectively. The brake generally indicated at 27 is applied by a spring 28 and released by hydraulic pressure in a cylinder 29. As shown in FIG. 7, the piston rod 30 engages a strap or belt 31 which is looped around pins 32 on brackets 33 and around the steering column so that extension of the strap by the spring 28 causes a frictional braking against the column. A centering and reinforcing strap 34 also embraces the pins 32 and is disposed behind the strap 31 to which it is attached. Either tractor is automatically made the slave upon depression of the accelerator in the opposite tractor while depression of the brake in either tractor automatically conditions it to act as the master tractor. This is accomplished by a valve 36 which is the accelerator valve and a valve 38 which is the brake actuating valve of the tractor. Upon depression of the accelerator pedal of the tractor of FIG. 8, the valve 36 is moved to the position shown for directing pressure from a source, here indicated as an accumulator 40, through a line 41 to the engine governor (not shown). Pressure is tapped from this line via a line 42 and directed to hydraulically actuated valve 43' of the tractor of FIG. 9 moving it to the position shown which exhausts pressure from the steering post brake cylinder 29' through a line 44' and to a sump as illustrated. Thus, when an operator enters the cab of either tractor, he need not be concerned as to whether the tractor is established as a master or slave since the very act of depressing the accelerator necessary to place the tractor in motion will lock the steering wheel on the slave tractor, and the steering wheel on the master tractor will be unlocked when he first applies the brakes. Consequently, if upon starting the steering wheel is found to be locked, merely touching the brakes will complete the conditioning of both tractors. The brake valve 38 is also actuated by a pedal to move it to the position illustrated in FIG. 8 where pressure is directed through a line 46 to brake cylinders not shown, the same pressure being tapped by a line 47 to actuate the hydraulic valve 43 to the position shown to communicate pressure from the accumulator 40 through a line 44 to the steering column brake cylinder 29 to compress the spring 28 and release the brake. As will be observed, the valves 43, 43' are both utilized but serve opposite purposes in the master and slave circuits.

Steering is accomplished in the master system by rotation of the steering wheel 25 to adjust the mechanical steering mechanism (not shown) in a housing 50. This mechanism shifts a valve 52, shown in its neutral position, toward the left communicating pressure from a source, here shown as an accumulator 53, to a line 54 and to the head end of steering cylinder 15 referred to in connection with the description of FIG. 2. Only one of the cylinders 15 is herein illustrated and it is to be understood that the opposite cylinder will include an identical circuit and valve like that shown at 52. In the present instance pressure would be supplied to the rod end of the opposite cylinder 15. With pressure directed to the head end of cylinder 15 as described, pressure in the rod end is relieved through a line 56 and back through the valve 52 to a sump as shown. Steering in the opposite direction adjusts the valve 52 toward the right where pressure from the source is directed into the line 56 and the rod end of the cylinder and pressure is exhausted from the head end through the line 54. The steering just described may be considered as that shown in FIG. 3 of the drawings wherein there is no steering connection to the slave tractor 12. Connection to this tractor and simultaneous steering thereof either of the circle type shown in FIG. 4 or the crab type shown in FIG. 5 may be accomplished upon shifting of a manually actuated valve illustrated at 60 in FIG. 8.

Circle steering is accomplished by shifting of the valve 60 toward the right and is controlled by the follow-up mechanism associated with the tractor steering of the kind described. This follow-up mechanism includes a rocker arm shown at 62 pivotally supported at its center with a bracket 63 on the tractor and having its opposite ends connected as by cables 64 with the arms 16 to which the jacks 15 are connected. The function of the cylinders included in the cables 64 will later be described but for the moment the cables can be considered as nonresilient. Upon turning movement of the tractor with respect to the arms 16 which will be remembered as fixed with respect to the body 10 the rocker arm 62 will pivot about its center support and through a link 66 will actuate a lever 67 which adjusts the steering mechanism in the housing 50 to neutral, also moving the valve 52 back to the neutral position shown so that when turning of the steering wheel 25 is discontinued, steering action will stop. For the purpose of the function so far described, the link 66 may also be considered as a rigid link having a fixed length.

Steering of the slave tractor is initiated by an extension 69 of the lever 67 which will engage either of two valves 70 and 71 to move it from its vented position illustrated to a position where pressure from a source line 72 is directed to either of lines 73 or 74. Thus, with the manual valve 60 shifted to the right, steering of the master tractor will cause pressure to be directed to one end of a cylinder 76' which forms a part of the link 66'. This cylinder contains a spring 77', stiff enough normally to cause the link 66' to act as a rigid member;

however, upon introduction of pressure to either end of the cylinder, the link 66' is in effect extended or retracted to impart swinging motion to follow-up lever 67' and since the steering post 26' is held against rotation the steering mechanism within the housing 50' will impart movement to the steering valve 52', thus through lines 54' and 56' energizing the steering cylinder 15' on the slave tractor. The selection of lines 73 and 74 by movement of the manual control valve 60 toward the right is such as to cause the slave tractor to steer in the manner illustrated in FIG. 4 so that circle steering is accomplished. Opposite steering would cause the slave tractor to move to a position parallel to the master tractor as in FIG. 5 to accomplish crab steering and this is effected by leftward adjustment of the valve 60 where lines 73 and 74 are reversed in their function of pressure lines and return lines.

Under the steering system described, the slave tractor is safeguarded against steering off of the course dictated by the master tractor. For example, should the wheels of the slave tractor strike an obstruction such as a large rock, excess pressure in the steering cylinders 15' could be relieved through a relief valve such as shown at 78' and 79' but since this would cause a variation in steering, the rocker arms 62' of the follow-up mechanism would also move, imparting movement to the follow-up lever 67' which would in turn adjust the steering valve 52' to cause make up of fluid in the steering jack 15' to the point where the tractor is immediately returned to its course.

As earlier described, and as set forth in greater detail in the above-mentioned copending application entitled Hitch for Heavy Duty Hauling Vehicles, Ser. No. 503,038, the body 10 (see FIG. 1) is capable of being raised and lowered with respect to the tractors 11 and 12 and the cylinders 13 move upwardly with the body. This causes a difference in the distance between the lever arms 16 on the cylinder 13 (see FIG. 8) and the ends of the rocker arm 62. It is for this reason that extensible units in the form of cylinders 80 with springs 82 urging them to a retracted position are included in the cables 64, thus the cables will, during their function as a part of the follow-up mechanism, always remain the same length but will be extended under the greater force applied upon upward movement of the body with respect to the tractors. Since the steering jacks 15 and 15' also extend between the body and the tractor, they must be capable of a change in length during vertical movement of the body and this is accomplished by check valves disposed in their pistons as illustrated in FIG. 6. Here the piston is shown at 84 and spring biased checks 85 and 86 open by force in opposite directions to communicate fluid under pressure between the head end and rod end of the cylinder. The springs are sufficiently stiff to prevent this transfer of fluid except under the high pressure encountered when the body is raised and lowered.

The system of steering hereinabove described is a complete and adequate system under normal operating conditions. It lends itself, however, to augmental steering which may be used in the event that very rough driving conditions are anticipated or in the event that quicker and more forceful steering is desired.

Steering-by-brake is well known in the tracto-motive art and is a method of steering in which brakes are applied to a wheel on one side of a tractor so that the wheel is retarded and acts as a pivot point for swinging movement of the tractor toward that side.

FIG. 10 shows schematically a system for applying brakes for steering automatically when the steering force of the jack-type steering described above exceeds a predetermined value. In FIG. 10 the tractor schematically represented is the master tractor comparable to that shown in FIG. 8. The forward wheels of the tractor are shown at 90 and the rear wheels at 91. Hydraulically actuated brakes 92 govern the wheels 90 and are supplied with fluid under pressure from a source not shown through a source line 93 and shuttle valves 94 illustrated with their ball check members 95 in the position that they assume when the brakes are applied. The source line 93 it will be understood is a continuation of the line 46 of FIG. 8 under control of the brake valve 38. During jack type steering, as described in connection with FIG. 8, pressure is applied to the head end of steering jack 15 by the line 54 or the rod end by the line 56. Pressure in the head end of jack 15 is transmitted by a line 98 through a valve 100 and to a hydraulically actuated valve 101. Similarly, pressure in the rod end of the jack 15 is transmitted through a line 102 through a valve 103 and to a hydraulically actuated valve 104. The valves 101 and 104 are normally in the closed position shown and their actuation to an open position is resisted as by spring means not shown. When the pressure in either end of the steering jack exceeds a predetermined value, indicating that augmented steering is desired, it opens the valve 101 or 104 as the case may be, communicating pressure from a source represented by accumulators 105 and 106 to one of the shuttle valves 94 moving its ball check 95 to the opposite position and transmitting actuating pressure to the brake 92 on that side of the tractor. Thus steering by braking takes place to augment the steering by jacks 15. The braking pressure from accumulators 105 and 106 is always maintained lower than braking pressure in the source line 93 so that full braking with both brakes takes precedence over steering.

The system so far described is that of the master tractor moving in a forward direction and since the slave tractor drives in a rearward direction, a reversal of braking as to the right and lefthand brakes is necessary. This is accomplished by the valves 100 and 103 which are illustrated in their master tractor position; however, when the same tractor becomes a slave, these valves are moved to the opposite position wherein valve 103 kill cause application of the righthand brake and valve 100 will cause application of the lefthand brake. The valves 100 and 103 are solenoid actuated valves and are in a circuit not shown which reverses the direction of driver of electric motors included in the power transmission of the tractors.

We claim:

1. A system for steering a vehicle having a body with a tractor pivotally connected to each end of said body in supporting relationship thereto, said system comprising hydraulic jack steering means between each tractor and said body for pivoting said tractors relative to said body, master hydraulic circuits in each tractor, slave hydraulic circuits in each of said tractors, acceleration and brake means in each of said tractors and control means for controlling said master and slave hydraulic circuits actuated by said acceleration and brake means, whereby actuation of one of said acceleration and brake means in either one of said tractors causes the other of said tractors to become the slave tractor and actuation of the other of said acceleration and brake means in said one of said tractors causes that tractor to become the master tractor.

2. The system of claim 1 in which each of said tractors has separate steering circuits for single tractor, circle, and crab steering and valve means on each tractor for selecting the circuit for the type of steering desired.

3. A system for steering a vehicle having a body with a tractor pivotally connected to each end of said body in supporting relationship thereto, said system comprising hydraulic jack steering means between each tractor and said body for pivoting said tractors relative to said body, a steering means in each of said tractors, said steering means operatively connected to said hydraulic jack steering means for changing the amount of hydraulic fluid in said hydraulic jack steering means, one of said tractors being a master tractor wherein the steering means therein is freely operable to change the direction of movement of both of said tractors when actuated, the other of said tractors being a slave tractor wherein the steering means therein is fixed against actuation, means in each of said tractors which, when actuated, cause the tractor in which actuated to become the master tractor and the other tractor to become the slave tractor, a follow-up means connected between said body and said steering means of each of said tractors and further operatively connected to the steering means in the opposite of each of said tractors, said follow-up means in said slave tractor causing the rate of change of direction of said slave tractor to be equal to that of said master tractor when said master tractor steering means is actuated, and said follow-up means in said master tractor causing a cessation of the rate of change of direction of both of said tractors when the actuation of said master tractor steering means is stopped.

4. The combination of claim 3 in which the follow up means causes steering of said slave tractor by means of a hydraulically extensible and retractable link in the follow up means of said slave tractor, and means responsive to steering movement of the master tractor to direct fluid under pressure thereto.

5. The vehicle steering system of claim 3 wherein said body may be elevated relative to said tractors, extensible means in said follow-up system including biasing means, said extensible means preventing extension of said follow-up means due to steering forces but permitting extension of said follow-up means due to elevating forces.

6. A steering system between articulated vehicle components including hydraulic steering jacks for causing angular displacement between the components, brakes on one component, means to apply the brakes selectively on either side thereof to cause steering by braking, and means limiting the selective application of said brakes in steering said vehicle components to instances when the hydraulic pressure in said steering jacks exceeds the normal predetermined maximum pressure utilized by said steering jacks in steering said vehicle components.

7. The combination of claim 6 in which two tractor components are articulately connected to opposite ends of a body with master-slave jack steering systems operable from either tractor, said tractors having reversible drives, and means automatically reversing the brake steering of either tractor when its direction of drive is reversed.

References Cited
UNITED STATES PATENTS

| | | | |
|---|---|---|---|
| 2,392,985 | 1/1946 | Harbers | 180—79.2 X |
| 2,422,813 | 6/1947 | Walch | 180—77 X |
| 2,494,324 | 1/1950 | Wright | 180—77 |
| 2,614,644 | 10/1952 | Gustafson | 180—79.2 |
| 2,674,333 | 4/1954 | Zeilman et al. | 180—79.2 |
| 2,883,774 | 4/1959 | Clifford | 180—77 X |
| 3,078,942 | 2/1963 | Wiebe | 180—51 X |
| 3,092,201 | 6/1963 | Bick | 180—79.2 |
| 3,151,694 | 10/1964 | Rogers | 180—6.64 X |

BENJAMIN HERSH, *Primary Examiner.*

J. A. PEKAR, *Assistant Examiner.*